United States Patent
Devlin et al.

(10) Patent No.: US 11,034,077 B2
(45) Date of Patent: Jun. 15, 2021

(54) THERMOFORMING MOLD TRIMMING SYSTEM AND PROCESS

(71) Applicant: DEVLINKS LTD., Arlington Heights, IL (US)

(72) Inventors: Robert Devlin, Chicago, IL (US); Scott Jackson, Mundelein, IL (US); David Findlay, Columbia, MO (US); Adin Kay Goings, Buffalo Grove, IL (US)

(73) Assignee: DEVLINKS, LTD., Arlington Heights, IL (US)

( * ) Notice: Subject to any disclaimer, the term of this patent is extended or adjusted under 35 U.S.C. 154(b) by 631 days.

(21) Appl. No.: 15/345,940

(22) Filed: Nov. 8, 2016

(65) Prior Publication Data

US 2017/0129159 A1 May 11, 2017

Related U.S. Application Data

(60) Provisional application No. 62/252,999, filed on Nov. 9, 2015.

(51) Int. Cl.
*B29C 51/10* (2006.01)
*B29C 51/26* (2006.01)
(Continued)

(52) U.S. Cl.
CPC .......... *B29C 51/266* (2013.01); *B29C 51/445* (2013.01); *B29C 69/001* (2013.01);
(Continued)

(58) Field of Classification Search
CPC ..... B29C 51/266; B29C 51/445; B29C 51/10; B29C 51/46; B29C 69/001; B29C 2791/006
See application file for complete search history.

(56) References Cited

U.S. PATENT DOCUMENTS 3,832,102 A   8/1974   Alroy
4,136,458 A   1/1979   Bell et al.
(Continued)

FOREIGN PATENT DOCUMENTS

| EP | 0854023 | 7/1998 |
|----|---------|--------|
| EP | 1125514 | 8/2001 |
| WO | 2004/041515 | 5/2004 |

OTHER PUBLICATIONS

International Search Report and Written Opinion for Int. App. No. PCT/US2016/060929, dated Jan. 24, 2017.
(Continued)

*Primary Examiner* — Ryan M Ochylski
(74) *Attorney, Agent, or Firm* — McDonnell Boehnen Hulbert & Berghoff LLP

(57) ABSTRACT

A thermoforming mold trimming system, apparatus, and method of use are disclosed. The thermoforming mold trimming apparatus includes a robot support structure with at least one robot secured to the robot support structure. The apparatus also includes a contact probe removably secured to the robot, the contact probe being configured to generate a trim path for a thermoformed molded part. The robot is programmed to follow the trim path generated by the contact probe. The robot then uses a blade to trim excess material of a finished molded part within the housing by following the trim path.

12 Claims, 9 Drawing Sheets

(51) Int. Cl.
  *B29C 69/00* (2006.01)
  *B29C 51/44* (2006.01)
  *B29C 51/46* (2006.01)
(52) U.S. Cl.
  CPC .............. *B29C 51/10* (2013.01); *B29C 51/46* (2013.01); *B29C 2791/006* (2013.01)

(56) References Cited

U.S. PATENT DOCUMENTS

| | | | |
|---|---|---|---|
| 4,879,933 A | 11/1989 | Floreancig et al. | |
| 4,995,148 A | 2/1991 | Bonomi et al. | |
| 5,031,483 A | 7/1991 | Weaver | |
| 5,134,911 A | 8/1992 | Busky et al. | |
| 5,168,787 A | 12/1992 | Blaimschein | |
| 5,390,128 A * | 2/1995 | Ryan | G05B 19/4083 318/568.23 |
| 5,768,768 A | 6/1998 | Best | |
| 6,277,319 B2 | 8/2001 | Hardgrove et al. | |
| 6,759,002 B1 | 7/2004 | Engwall et al. | |
| 6,893,603 B2 | 5/2005 | Rohde et al. | |
| 7,252,734 B2 | 8/2007 | Merino Rojo et al. | |
| 8,291,593 B2 | 10/2012 | Gutt et al. | |
| 8,832,954 B2 | 9/2014 | Atwell et al. | |
| 8,892,235 B2 | 11/2014 | Choi et al. | |
| 2001/0042946 A1 | 11/2001 | Schlieber et al. | |
| 2004/0104506 A1 | 6/2004 | Schelmbauer et al. | |
| 2005/0248064 A1 | 11/2005 | Ogawa et al. | |
| 2007/0065642 A1 | 3/2007 | Gupta et al. | |
| 2013/0144422 A1* | 6/2013 | Choi | A61C 1/084 700/119 |

OTHER PUBLICATIONS

Callari, J., Custom Thermoformer Relies on Robotic Trimming, Plastics Technology, Dec. 2013.
Profile Plastics, Inc.—Manufacturing, Profile Plastics, Feb. 24, 2015.
RoboTrim RT-1002 Router Trimming System, DRS Dynamic Robotics Solutions, 2016.
RPT to Demonstrate Router Trimming, Material Handling and Software Capabilities at 2006 SPE Thermoforming Conference, Robotic Production Technology, Sep. 6, 2006.

* cited by examiner

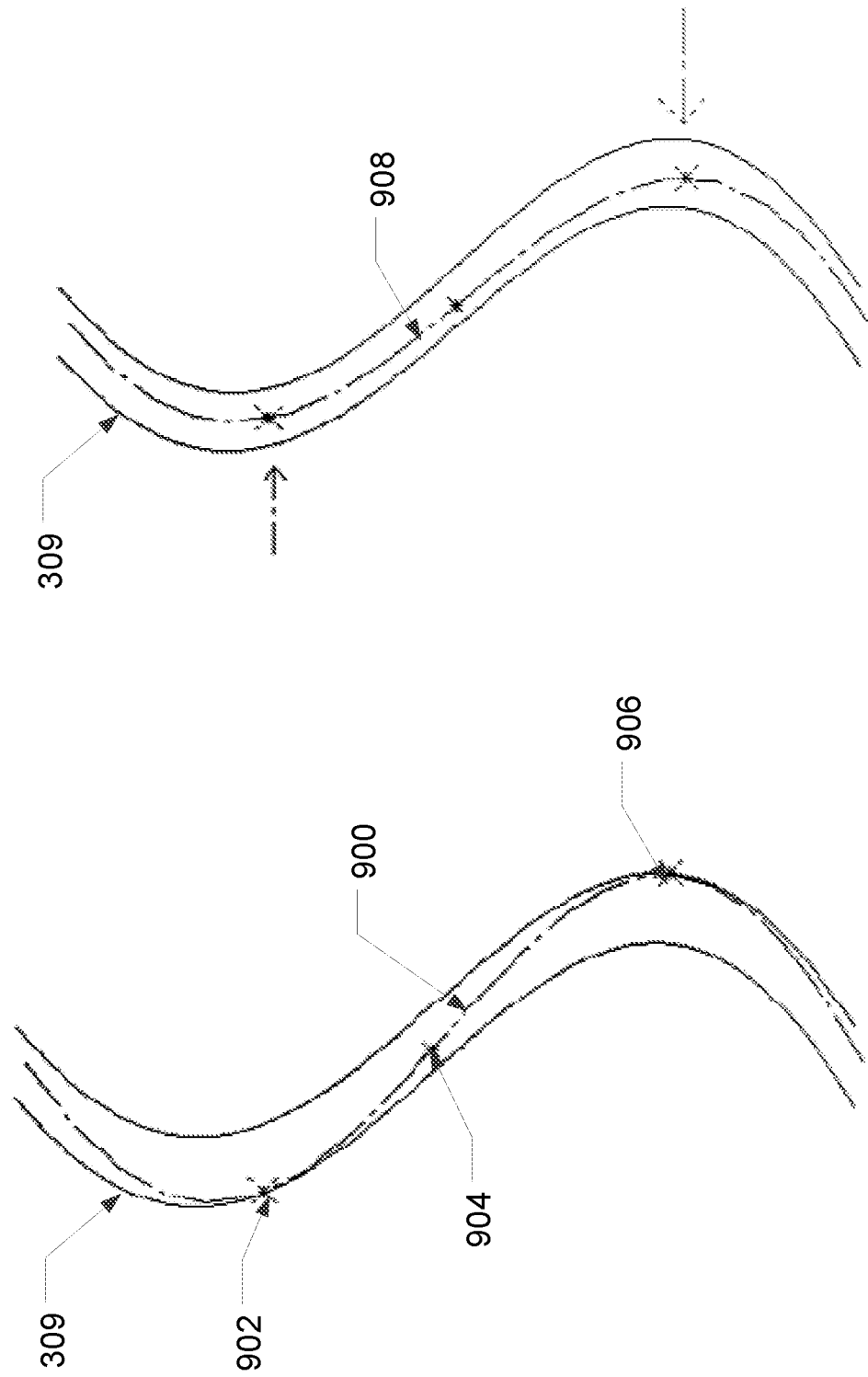

THERMOFORMING MOLD TRIMMING SYSTEM AND PROCESS

CROSS REFERENCE TO RELATED APPLICATIONS

The present application claims priority to U.S. Provisional Patent Application No. 62/252,999 filed Nov. 9, 2015. The entire disclosure contents of this application is herewith incorporated by reference into the present application.

BACKGROUND

Thermoforming is a process for producing manufactured parts. A mold, sometimes referred to as tooling, can be machined from aluminum or steel in the shape of the manufactured part. A plastic sheet is heated until the material is at a pliable temperature. The mold is then pushed up into the pliable sheet and vacuum is drawn between the sheet and the mold to form the sheet to the mold features. The formed sheet then cools in the mold to a temperature where it is no longer pliable. Once cooled, the formed sheet is removed from the mold and the finished part is trimmed free of the excess material of the sheet.

In the traditional thermoforming process, cutting or trimming the formed part is usually performed outside the thermoforming machine by an operator using a blade or by a fixture including a robot. The operator or fixture trims the finished part after the thermoformed sheet is completely cooled, a process which is time and labor intensive. However, many thermoformed parts shrink by about 10% after being removed from the mold. Thus, removing the part from the mold before trimming will not allow for consistent trimming to take place, and may result in defective parts or parts of variable quality.

SUMMARY

This disclosure relates to devices and methods of a thermoforming mold trimming system and process.

The following embodiments and aspects thereof are described and illustrated in conjunction with systems, tools and methods which are meant to be exemplary and illustrative, not limiting in scope.

In one embodiment, a thermoforming mold trimming apparatus is disclosed. The thermoforming mold trimming apparatus includes a robot support structure, at least one robot secured to the robot support structure, and a contact probe removably secured to the at least one robot. The contact probe is configured to generate a trim path for a thermoformed molded part. The at least one robot is programmed to follow the trim path generated by the contact probe, and to use a blade to trim excess material of a finished molded part within the robot support structure by following the trim path.

In another embodiment, a system for molding a part is disclosed. The system includes a thermoforming mold, a robot support structure surrounding the thermoforming mold, at least one robot secured to the robot support structure, and a contact probe removably secured to the at least one robot. The contact probe is configured to generate a trim path for a molded part. The at least one robot is programmed to follow the trim path generated by the contact probe, and to use a blade to trim excess material of a finished molded part within the robot support structure by following the trim path.

In yet another embodiment, a method of molding a part is disclosed. The method comprises providing a thermoforming mold, a robot support structure surrounding the mold, and a robot secured to the robot support structure. The robot includes a contact probe. The method further includes generating a trim path by moving the contact probe along a trench machined in the mold, removing the contact probe from the robot, securing a blade to the robot, and trimming the mold of excess material using the blade, according to the generated trim path, to form a finished molded part.

In addition to the exemplary aspects and embodiments described above, further aspects and embodiments will become apparent by reference to the drawings and by study of the following detailed description.

BRIEF DESCRIPTION OF THE FIGURES

Exemplary aspects are illustrated in the drawings. It is intended that the embodiments and figures disclosed herein are to be considered illustrative rather than restrictive.

FIGS. 9A and 9B show an example path modification made by the robots.

DETAILED DESCRIPTION

A mold trimming apparatus and system for use in a thermoforming process is disclosed. The apparatus may house the mold during the cooling process to perform the trimming process. Thus, the trimming of a formed part is actually performed in the mold itself. The mold trimming apparatus may include one or more robots, with blades removably mounted to the end of each of the robots. The blades can be exchanged for contact probes which are used to teach the robot the actual trim path in the mold. The probes may be attached either by manual release or by an automatic tool changer. The robots can use the blades to automatically trim the part while it cools in the mold to create a finished part separated from scrap material at the end of the cooling process.

Additionally, the equipment for mold trimming can be included as part of the thermoforming mold and system, which can eliminate extra equipment required for trimming. Trimming may be performed automatically during the cooling process in the mold, which can eliminate or reduce the additional process time of waiting for the part to cool before trimming and the labor involved in manual trimming, and can result in parts of superior quality, and can produce better parts more quickly.

Figure 1:
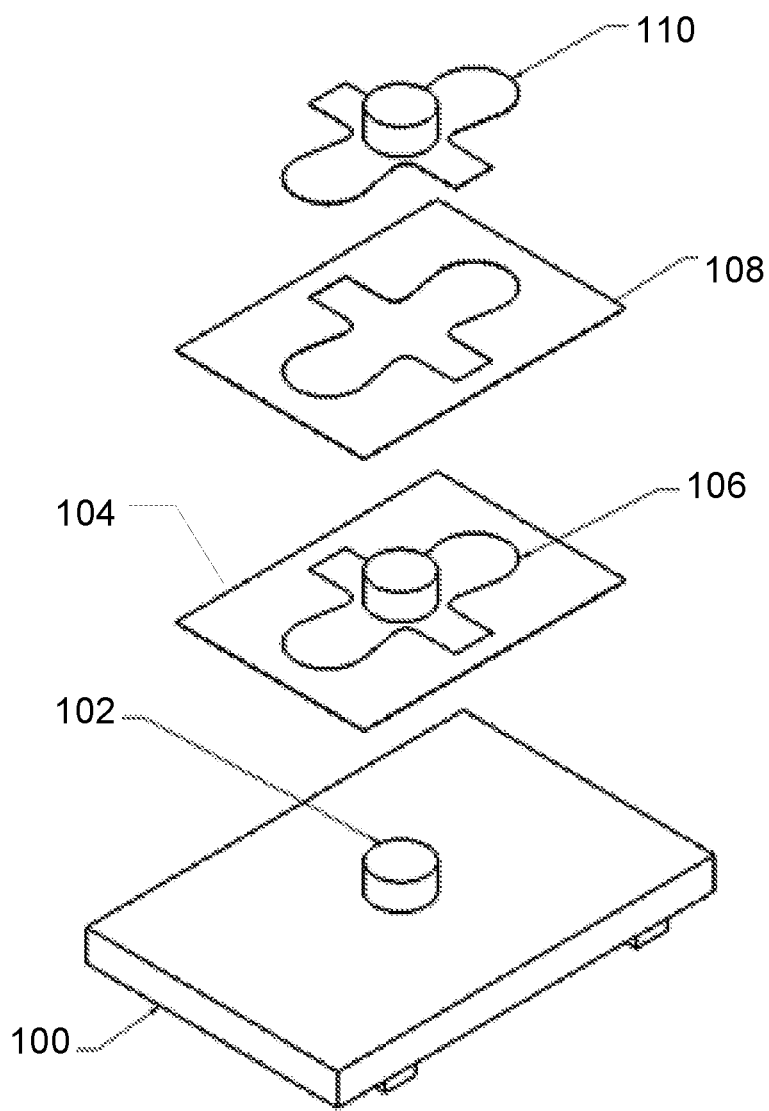
FIG. 1 is an exploded view of a mold in a traditional thermoforming process.

FIG. 1 shows a traditional thermoforming mold 100. The mold 100 may include mold features 102, which form a particular shape for a product. In one aspect, an operator or sheet handling device can load a plastic sheet (not shown) into a clamp (not shown). The clamp then holds the sheet and readies it for heating. Heat may be applied to the sheet by either moving an oven to the sheet or moving the sheet over an oven, for example. The applied heat brings the material to a pliable temperature. The mold 100 is pushed up into the pliable sheet. Vacuum is then drawn between the sheet and the mold to form the sheet to the mold features 102. The formed sheet 104 then cools in the mold to a temperature where it is no longer pliable. Once cooled, the formed sheet 104 is removed from the mold. The formed sheet 104 is then trimmed along a trim line 106 via a cutting process to remove excess material 108, thereby creating a finished molded part 110.

As mentioned above, the cutting process is usually performed on the finished part 110 once it has been removed from the mold either manually by an operator using a blade or automatically by a robot in a fixture. The operator or robot trims the part after the thermoformed sheet is completely cooled.

Figure 2:
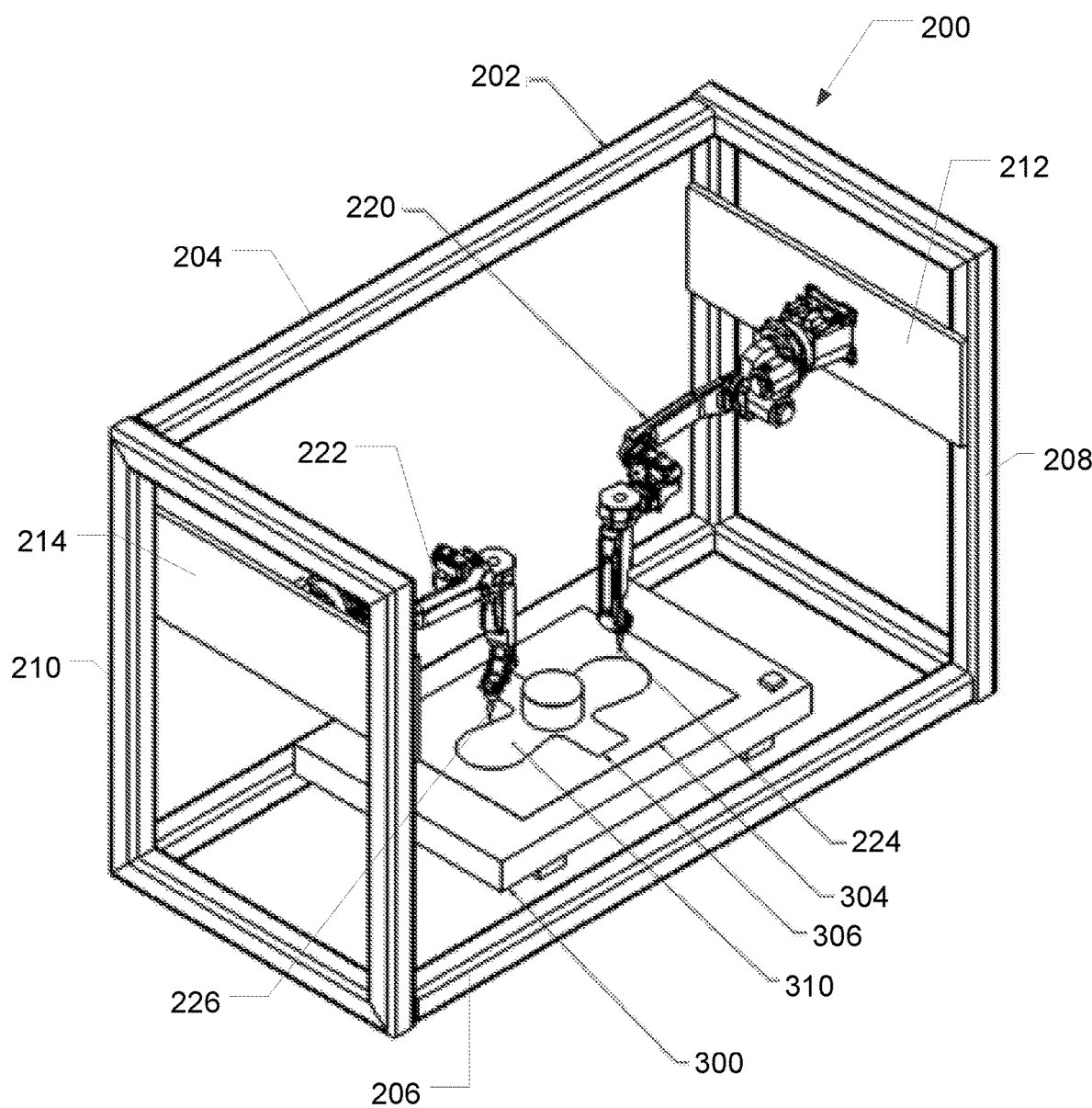
FIG. 2 is a perspective view of an example trimming apparatus of the present application.

Referring now to FIG. 2, a mold trimming apparatus 200 is shown. As mentioned above, the mold trimming apparatus 200 can be formed as part of the thermoforming mold and system, thereby allowing the trimming of the finished part to be performed while the part is still in the mold. The mold trimming apparatus 200 includes a housing or robot support structure 202. The structure 202 may include a back frame 204, a bottom frame 206, and two side frames 208, 210. The frames are open to allow access inside the structure 202. In alternative embodiments, the frames may be solid pieces, such as by including panels in between the frame beams, for example. The top and front portions of the structure 202 may be open as shown in FIG. 2. In other embodiments, the top and front portions of the structure may also include frames. The structure 202 may be constructed of steel, for example. It should be understood that the structure may be formed of any other suitable material as well. In one example, the robot support structure 202 is designed so the frame is able to counteract the robot inertia running at max speed to prevent a blade from contacting a trench machined into the mold. In other embodiments, the robot support structure 202 may take other forms as well.

The structure 202 may include a first plate 212 mounted to one side frame 208 and a second plate 214 mounted to the other side frame 210. In alternative embodiments, the plates 212, 214 may be mounted to different portions of the structure 202. In one example, the plates 212, 214 are made from steel, but could be constructed of other suitable materials in other examples.

One or more robots may be mounted to the structure 202. As shown in FIG. 2, two robots or robotic arms 220, 222 are mounted to plates 212, 214 of the robot support structure 202. The robots 220, 222 each include at least one blade 224, 226 to pierce the thermoformed material within a mold 300. The blades 224, 226 may be removably secured to the robotic arms 220, 222 by one or more bolts, for example. However, it should be understood that the blades 224, 226 could be secured to the robotic arms 220, 222 by any known fastening device. In some embodiments, the blades 224, 226 may be a single piece of carbide, high speed steel, or ceramic, for example. Blade material selection and design, in some cases, can be based upon the nature of the thermoformed material. In some embodiments, the blades 224, 226 may include one cutting edge or two opposite cutting edges. In the case where two cutting edges are used, the second edge can be used when the first edge becomes dull or blunt. This could be done automatically such as when the servo motors of the robot sense extra drag on the blade, for example. In one embodiment, when the robot senses too much drag on the blade the robot can automatically rotate the blade 180 degrees to start cutting with the second cutting edge.

In one embodiment, the robots 220, 222 may be six-axis robots. That is, each robotic arm has six different axes along which it is configured to move. In other embodiments, the robots 220, 222 may be any type of manipulating arm or robot having anywhere from three to six axes, depending upon the complexity of the part to be thermoformed. The more axes the robots include, the more complex shapes the robot can trim in the mold.

The structure 202 may be placed around a mold 300. The mold 300 may include mold features 302, which form a particular shape for a product. As mentioned above, a plastic sheet 304 may be placed on the mold 300. Heat may be applied to the sheet, which brings the material to a pliable temperature. The mold 300 then forms the sheet to the mold features 302. The formed sheet is then trimmed along a trim line 306 via the robots 220, 222 to remove excess material 308, thereby creating a finished molded part 310.

Figure 3:
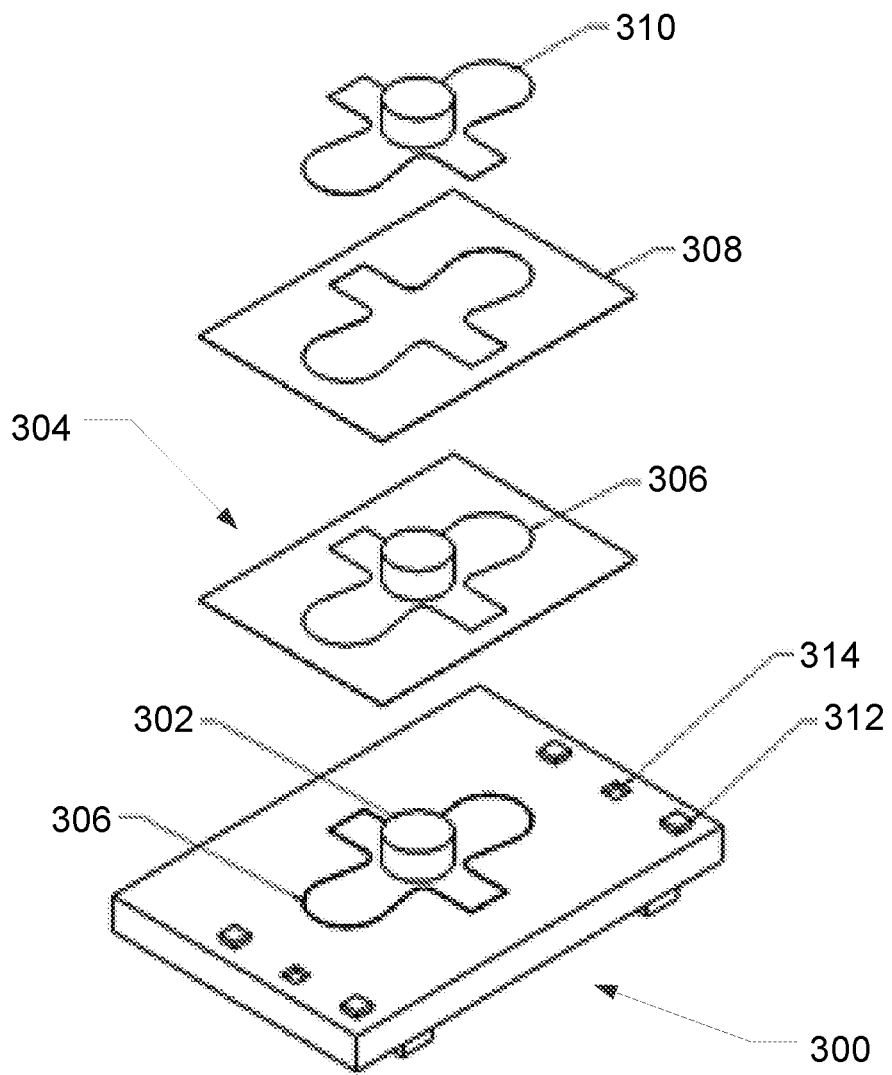
FIG. 3 is an exploded view of a mold for use with the trimming apparatus shown in FIG. 2.
Figure 4B:
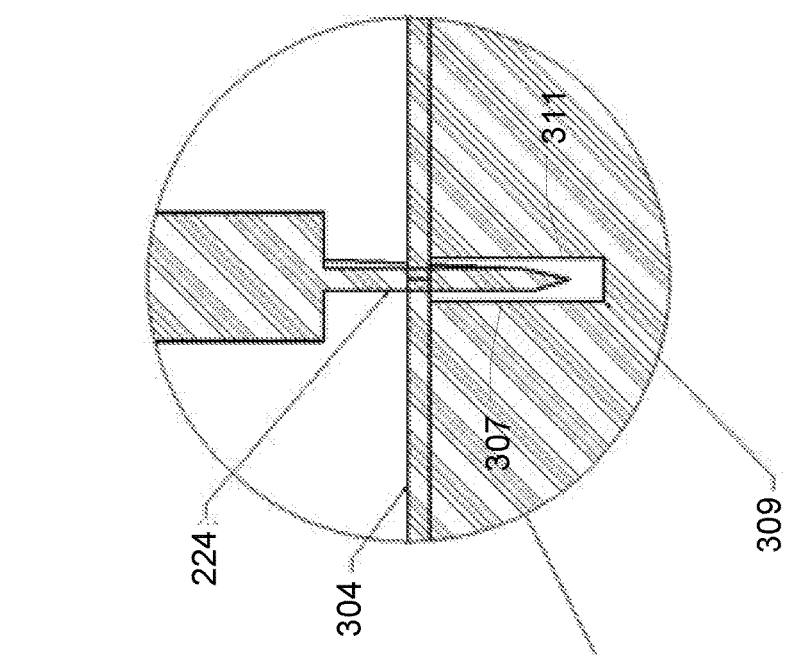
FIG. 4B is a close-up view of the blade shown in FIG. 4A.
Figure 4A:
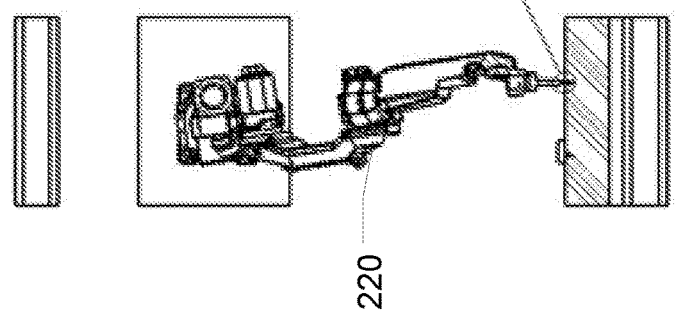
FIG. 4A is a sectional view taken along line A-A in FIG. 4.

In order to accommodate trimming in the mold, in some embodiments, additional features may be placed in the mold, as shown in FIG. 3. For example, a trench 309 (shown in FIG. 4A) may be machined centered on the trim line 306 of the part. The trench 309 can provide clearance for the blades 224, 226 to pierce the material and then move along the trim line 306. The trench may have a width of about 0.125 in. to about 0.250 in., for example. In some cases where the plastic sheet 304 being thermoformed has a greater thickness, a wider trench may be used, such as a trench with a width of about 0.250 in. to about 0.500 in., along with a high speed spindle having an end mill cutting tool to cut through the sheet 304. The wider trench in this case allows additional clearance for the end mill cutting tool. In other embodiments, other cutting tools may be used as well.

When a wider trench is machined into the mold 300, vacuum channels may be added to the trench 309 to avoid drawing material into the trench during the thermoforming process. In some examples, when using a wider trench, positive air channels (not shown) can be added to the trench 309, and pressurized air can be forced into the trench 309 through the positive air channels during the thermoforming process by an air compressor, for example, to prevent unwanted material from sinking into the trench. In this case, an air pressure regulator (not shown) may be used to monitor the pressure in the trench 309. This positive pressure can help keep the hot plastic sheet from drawing into the trench 309, and can also provide a surface for the blade to intersect during trimming.

Figure 7A:
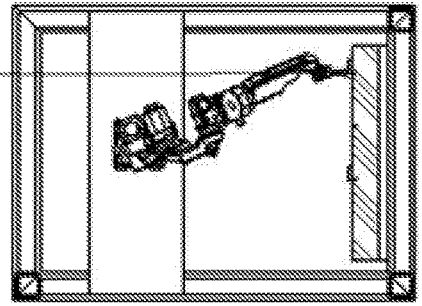
FIG. 7A is a sectional view taken along line A-A in FIG. 7.
Figure 7B:
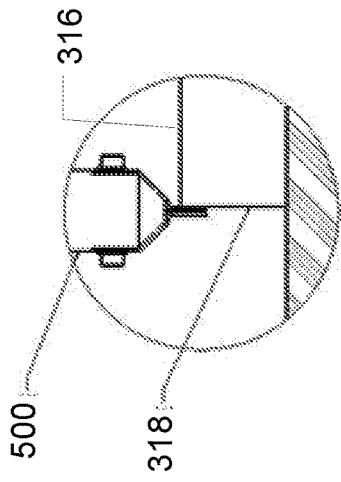
FIG. 7B is a close-up view of the probe shown in FIG. 7A.

In some embodiments, datum locations such as a datum block 312 or a datum pocket 314 may also be machined into the mold 300. The datum blocks 312 protrude from the mold 300 and the datum pockets 314 are formed as recesses within the mold. In some embodiments, the mold 300 can have three datum locations for each robot 220, 222. In some examples, each datum location can have at least two perpendicular surfaces, such as horizontal surface 316 and vertical surface 318 shown in FIG. 7B. The function of the datum locations is described in more detail below.

Figure 4:
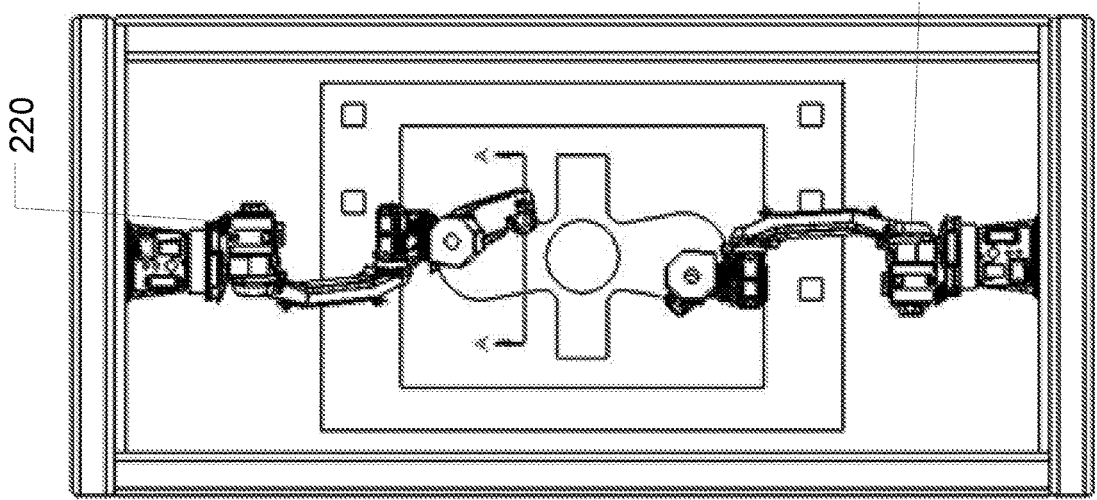
FIG. 4 is a top view of the trimming apparatus shown in FIG. 2.

Referring to FIG. 4, a top view of the apparatus is shown. As mentioned above, the robots 220, 222 can use the blades 224, 226 to pierce the thermoformed material, and can move the blades along the trim line 306 to separate the material of the finished part 310 from the scrap material 308. In one example, shown in FIGS. 4A and 4B, the blades 224, 226 pass between the two walls 307, 311 of the mold trench 309 during trimming. During the trimming process, the robots 220, 222 follow the centerline of the trench 309 to prevent the blades 224, 226 from making contact with the mold 300, since the mold can be damaged or shattered if the blades touch the wall of the trench 309.

Figure 5:
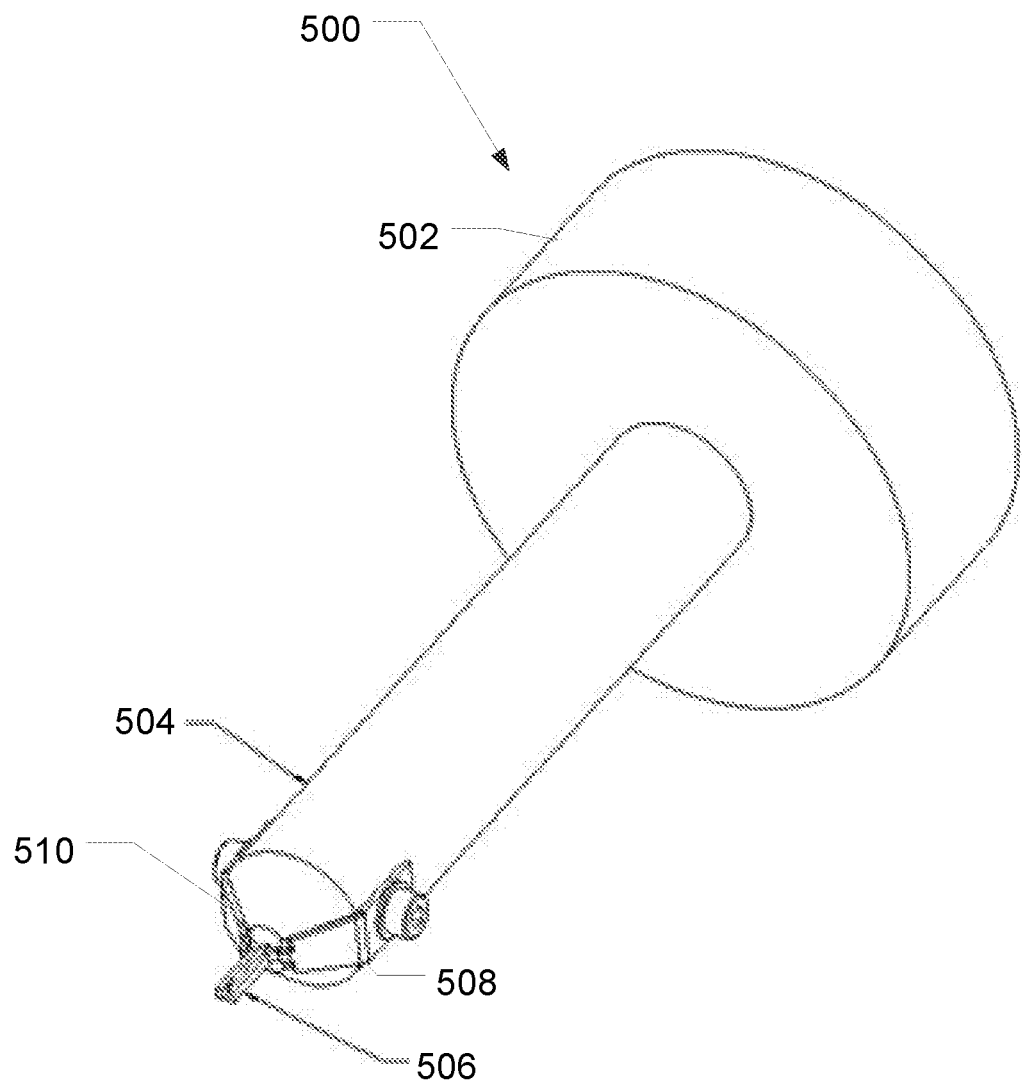
FIG. 5 is a close-up view of an example contact probe for use with the trimming apparatus of the present application.

Before the mold 300 is set for a particular part, a process can be performed to generate a trim path to be used by the robots 220, 222. Referring to FIG. 5, the robots 220, 222 can use a contact probe 500 to identify mold surfaces and to calculate or generate a trim path 306 for a particular part to be molded. The contact probe 500 can be digital or analog, and can be capable of sensing the direction of contact with a physical surface. The contact probe 500 may include a first portion 502 and a second portion 504. The first portion 502 may be configured to be connected to the robots 220, 222 in place of the blade 224, 226 using bolts or any suitable fastener. The second portion 504 may include a tip 506 having electrical contacts 508, 510 which extend along the length of the tip 506. Each contact 508, 510 extends along a different side of the tip 306, and is wired into a separate electric input on the robot controller. The second portion 504 may be formed as an insulator, which can prevent electrical contact between the two contacts 508, 510. In some embodiments, the tip 506 of the contact probe 500 is no wider than the width of the trench 309.

The contact probe 500 can determine contact with a mold surface via the electrical contacts 508, 510. In some embodiments, the mold 300 can be grounded, and the robot can energize each of the electrical contacts on the contact probe 500. When a contact touches a mold surface 300, it can form an electric circuit. The robots 220, 222 can interpret the completion of this electrical circuit as contact between the contact probe 500 and mold surface 300. The robots 220, 222 can also determine which electrical contact 508, 510 completed an electrical circuit with the mold as direction of contact.

The robots 220, 222 may be in communication with and programmed by a computing device. The computing device stores data for use by the robots 220, 222. The computing device also stores the trim path generated by the contact probe 500. The computing device may be part of the robots 220, 222, or a separate device in communication with the robots. The computing device includes software to control and program the robots 220, 222.

In use, as shown in FIGS. 6-9, the mold trimming system can determine a trim path for a part to be molded, and then perform the trimming process within the mold. The process can be performed each time a new mold for a different product is placed inside the thermoforming machine for thermoforming.

Figure 7:
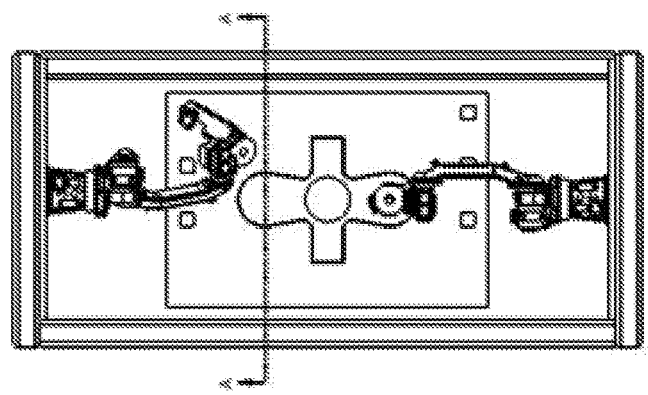
FIG. 7 is a top view of the trimming apparatus shown in FIG. 6.
Figure 6:
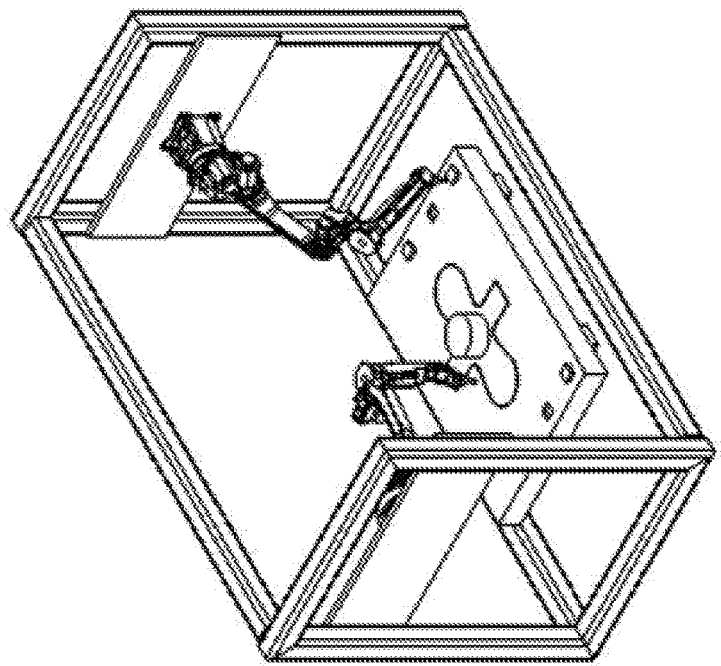
FIG. 6 is a perspective view of the trimming apparatus including the probe shown in FIG. 5.

In one embodiment, the system can perform a referencing process to determine the exact position and orientation of the mold 300, as shown in FIGS. 6-7. Each robot 220, 222 may use a contact probe 500 to identify two datum surfaces at three datum locations. During the referencing process, the robots 220, 222 can move the probe 500 until contact is made with one datum surface, such as horizontal surface 316, to establish a reference in one direction. The robots 220, 222 can then move the contact probe 500 in a different direction, such as a perpendicular direction, until contact is made with the a second, perpendicular datum surface, such as vertical surface 318. The robots 220, 222 can repeat this referencing process for each of the three datum locations on the mold 300. The referencing process therefore creates three zero locations that the robots 220, 222 can use to determine the exact position and orientation of the mold 300. In other embodiments, more or less datum locations can be used to determine the location and orientation of the mold.

The robots 220, 222 can then generate and store the trim path 306 in relation to the reference. Once the reference is established, the robots can use the information to locate the theoretical trim path. The theoretical trim path can be the actual CAD data as stored in computer data for a particular part to be thermoformed. The theoretical trim path is the ideal trim path for the thermoformed part. However, the theoretical trim path can vary from the actual trim path. Such variations can be caused by machining inaccuracies in the trench, inaccuracies in the robots ability to position, and/or deformations caused by the thermal expansion of the mold during the thermoforming process.

Figure 8A:
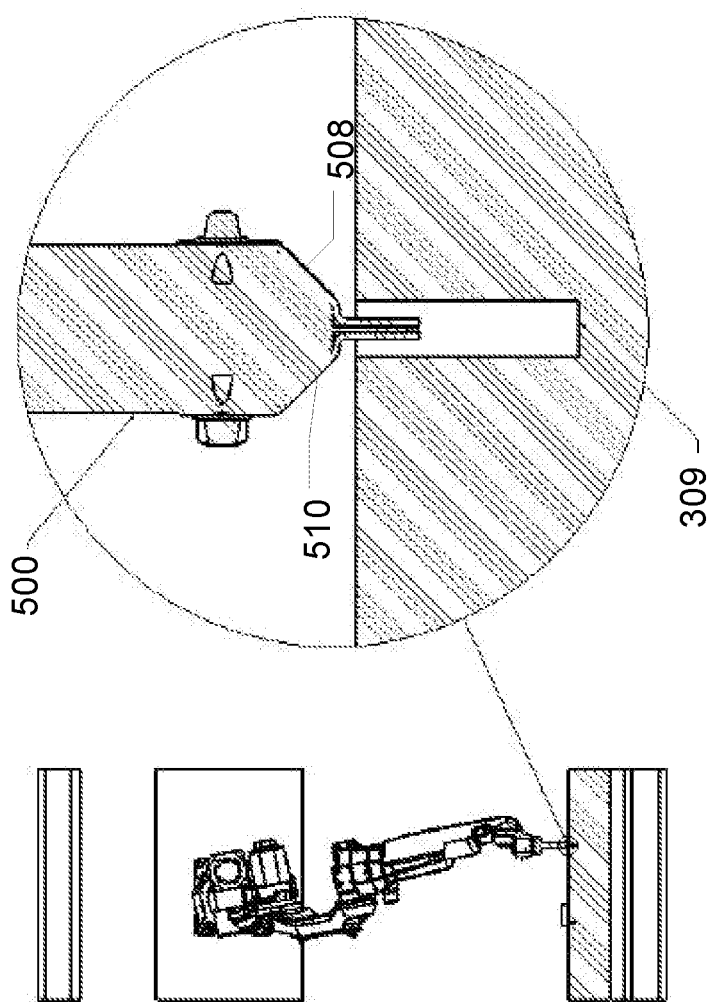
FIG. 8A is a close-up view of the probe in one position within a trench in the mold.
Figure 8B:
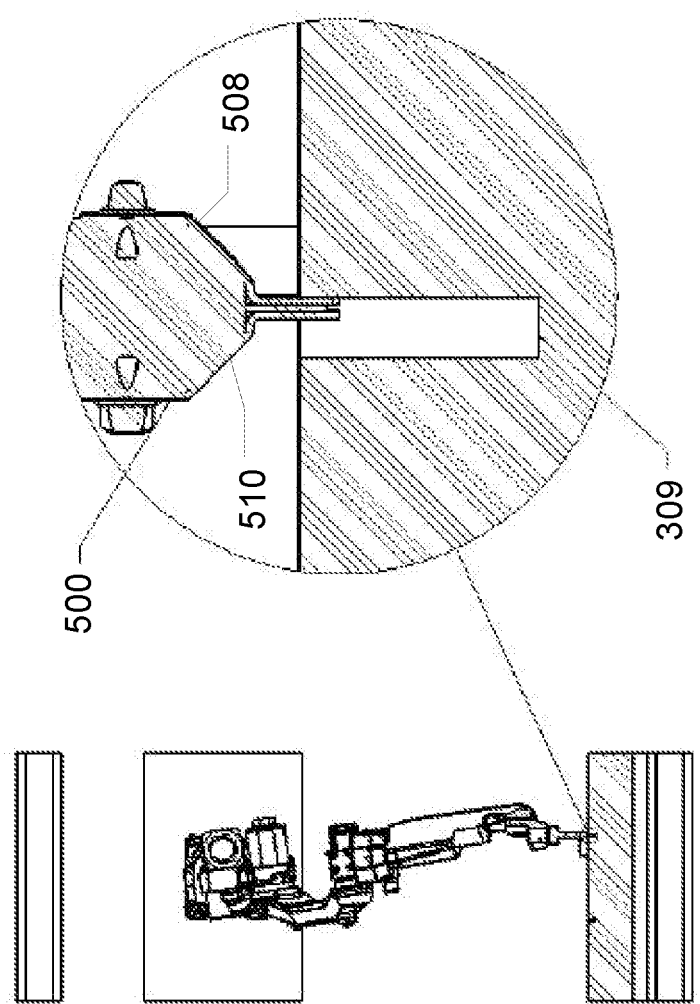
FIG. 8B is a close-up view of the probe in another position within a trench in the mold.

The robots 220, 222 can modify the trim path to help accommodate the variations between the theoretical trim path and the real trim path. In some embodiments, each robot can begin by moving the contact probe 500 along the theoretical trim path inside the trench 309. Where the theoretical trim path matches the actual trim path closely, the contact probe 500 may not collide with the walls of the trench 309, as shown in FIG. 8A. However, when the real trim path varies from the theoretical trim path, the contact probe 500 may collide with a wall of the trench 309, as shown in FIG. 8B. The robot can then modify the trim path away from the direction of contact with the trench wall, and continue along the theoretical trim path, as described below with respect to FIGS. 9A and 9B.

FIGS. 9A and 9B show an example of path modification made by the robots 220, 222. Initially, the robots move the probe 500 along the theoretical trim path 900. The theoretical trim path 900 represents the theoretical middle of the trench 309. As explained above, heat from the process and inaccuracies in machining of the trench 309 may cause the actual trench boundaries to interfere with the theoretical trim path 900.

Three points along with theoretical trim path 900 are given for reference: 902, 904, and 906. When the robot moves the probe 500 along the theoretical trim path 900, the robot detects interference on the left for 902, no interference for 904, and interference on the right for 906 via the electrical contacts 508, 510 of the probe 500. The robot may then adjust the trim path to the right for 902, perform no adjustment for 904, and adjust the path to the left for 906, as shown in FIG. 9B. This adjustment creates the modified or correct trim path 908.

The robots 220, 222 may then repeat this process a number of times to generate a final correct trim path 908 that does not interfere with the actual trench boundary. In this example, the correct trim path 908 does not interfere with the actual trench boundary after the initial set of adjustments. However, this may not be the case in all applications, and thus a correct trim path 908 may generate new interferences and perform further adjustments. Once the robot is capable of tracing the path without any collisions, the correct trim path 908 is complete, and it becomes the trim path 306 of the thermoformed part.

After the trim path 306 has been determined and generated, the contact probe 500 can be removed from the robots 220, 222, and the blades 224, 226 can be attached to the robots in their place. The contact probe 500 can be removed manually by an operator, or automatically by the robots 220, 222 using an automatic robot tool changer or any known quick change system, for example. The robots can then use the blades 224, 226 to trim the part using the trim path 306.

One advantage of the described system and process is elimination of the need for manual trimming. The robots can trim the waste material from the finished part during the cooling portion of the thermoforming molding process, without adding any additional cycle time to the molding process. The time between taking the part off of the mold and securing it into a fixture for trimming is notable due to the shrinking of the part. The trimmed edge quality can also be superior compared to manual freehand trimming.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A method of molding a part comprising:
providing an apparatus comprising a thermoforming mold, a robot support structure surrounding the mold, and a robot secured to the robot support structure, the robot including a contact probe;
forming a molded part from the thermoforming mold;
cooling the molded part within the apparatus;
trimming the molded part within the apparatus during the cooling step, wherein the trimming includes:
generating a trim path by moving the contact probe along a trench machined in the mold, wherein generating the trim path comprises:
moving the contact probe along a theoretical trim path for the part;
modifying the theoretical trim path by adjusting the probe to move within the trench boundaries; and
generating a correct trim path;
removing the contact probe from the robot;
securing a blade to the robot; and
trimming the mold of excess material using the blade, according to the generated trim path, to form a finished molded part.

2. The method of claim 1 wherein the mold comprises datum locations, and wherein generating a trim path further comprises performing a referencing process including moving the probe along one direction of a surface of the datum location, and then moving the probe along a second direction of a perpendicular surface of the datum location.

3. The method of claim 1 further comprising removing the contact probe and installing the blade via an automatic tool change system.

4. The method of claim 1, wherein the robot support structure comprises at least one six-axis robot.

5. The method of claim 1, wherein the contact probe comprises one or more electrical contacts and an insulator.

6. The method of claim 1, wherein the robot includes or is in communication with a computing device.

7. The method of claim 1, further comprising two robots secured to the robot support structure.

8. The method of claim 1, wherein positive air pressure is forced into the trench.

9. The method of claim 2, wherein the datum locations are formed as datum blocks protruding from the thermoforming mold.

10. The method of claim 2, wherein the datum locations are formed as datum pockets within the thermoforming mold.

11. The method of claim 2, further comprising three datum locations.

12. The method of claim 2, wherein the datum locations each have two perpendicular surfaces.

* * * * *